United States Patent
Markus

[19]
[11] Patent Number: 6,046,880
[45] Date of Patent: Apr. 4, 2000

[54] DEVICE FOR BLOCKING INSERTION OF UNDERSIZED OBJECTS

[75] Inventor: Pieter G. Markus, Hoogvliet, Netherlands

[73] Assignee: U.S. Phillips Corporation, New York, N.Y.

[21] Appl. No.: 08/234,502

[22] Filed: Apr. 28, 1994

Related U.S. Application Data

[63] Continuation of application No. 08/033,947, Mar. 18, 1993, abandoned, which is a continuation of application No. 07/818,413, Jan. 6, 1992, abandoned, which is a continuation of application No. 07/504,188, Apr. 3, 1990, abandoned.

[30] Foreign Application Priority Data

Apr. 3, 1989 [NL] Netherlands ............. 8900805

[51] Int. Cl.[7] .................... G11B 17/02; G11B 15/675
[52] U.S. Cl. .............. 360/99.06; 360/96.5; 369/77.2; 242/338.4
[58] Field of Search ............. 360/60, 132, 133, 360/94, 137, 92, 96.5, 99.02, 99.06, 97.01; 206/387, 444; 369/221, 49, 50, 77.1, 77.2; 242/338.4

[56] References Cited

U.S. PATENT DOCUMENTS

| | | | |
|---|---|---|---|
| H000079 | 7/1986 | Bartholet et al. | 360/133 |
| 3,703,295 | 11/1972 | Yamamoto et al. | 360/94 |
| 3,755,641 | 8/1973 | Rackman | 360/60 |
| 3,779,542 | 12/1973 | Barker et al. | 360/97.01 |
| 3,820,796 | 6/1974 | Tahara | 360/94 |
| 3,839,736 | 10/1974 | Hoshall | 360/60 |
| 4,005,487 | 1/1977 | Asai et al. | 360/94 |
| 4,005,489 | 1/1977 | Asai et al. | 360/94 |
| 4,012,011 | 3/1977 | Saito | 360/132 |
| 4,268,877 | 5/1981 | Moris et al. | 360/94 |
| 4,380,780 | 4/1983 | Hirata et al. | 360/97 |
| 4,385,958 | 5/1983 | Long | 206/387 |
| 4,482,929 | 11/1984 | Beck et al. | 360/128 |
| 4,602,299 | 7/1986 | Saito | 360/60 |
| 4,685,095 | 8/1987 | Rudy et al. | 369/36 |

(List continued on next page.)

FOREIGN PATENT DOCUMENTS

| | | | |
|---|---|---|---|
| 2739172 | 10/1978 | Germany | 360/96.5 |
| 60-66358 | 4/1985 | Japan | 360/132 |
| 60-106092 | 6/1985 | Japan | 360/132 |
| 60-131669 | 7/1985 | Japan | 360/96.5 |
| 60-195790 | 10/1985 | Japan | 360/60 |
| 61-168168 | 7/1986 | Japan | 360/132 |
| 61-187188 | 8/1986 | Japan | 360/96.5 |
| 61-206992 | 9/1986 | Japan | 360/96.5 |
| 61-206993 | 9/1986 | Japan | 360/96.5 |
| 61-214186 | 9/1986 | Japan | 360/133 |
| 62-47860 | 3/1987 | Japan | 360/96.5 |
| 63-9072 | 1/1988 | Japan | 360/99.02 |
| 63-112890 | 5/1988 | Japan | 360/96.5 |
| 63-142561 | 6/1988 | Japan | 360/96.5 |
| 63-148457 | 6/1988 | Japan | 360/96.5 |
| 1-294265 | 11/1989 | Japan | 360/96.5 |

OTHER PUBLICATIONS

IBM Tech. Discl. Bull., vol. 20, No. 11a, Apr. 1978, "Mechanical Credit Card Lockout" by R.J. Laybourn.

IBM Tech Discl Bull, vol. 14, No. 8, Jan. 1972, "Two–Element Mechanical Gate" by L.D. Lewis et al.

IBM Tech Discl Bull, vol. 30, No. 5, Oct. 1987, "Disk Cartridge Indicators" (by no author).

IBM Tech. Discl. Bull., vol. 6, No. 6, Nov. 1963, "Aligning Device for Bi–Width Documents", (No author).

*Primary Examiner*—Craig A. Renner
*Attorney, Agent, or Firm*—David R. Treacy

[57] ABSTRACT

A device such as a cassette recorder of a computer has a wall portion formed with a loading aperture for introduction of standard-type objects, such as a magnetic-tape cassette or a cassette for an optical or magnetic disc. To prevent damage or incorrect operation, the device includes a blocking mechanism which blocks the introduction of objects having a smaller width and/or height. A spring urges a partially inserted object in a direction parallel to the dimension or dimensions to be sensed.

13 Claims, 4 Drawing Sheets

U.S. PATENT DOCUMENTS

| | | | |
|---|---|---|---|
| 4,723,185 | 2/1988 | Maeda | 360/133 |
| 4,724,492 | 2/1988 | Kosaka et la. | 3698/49 |
| 4,736,356 | 4/1988 | Konshak | 369/77.2 |
| 4,743,991 | 5/1988 | Akigama | 360/99.06 |
| 4,747,001 | 5/1988 | Kokubo et al. | 360/94 |
| 4,792,872 | 12/1988 | Nakanishi et al. | 360/96.5 |
| 4,803,575 | 2/1989 | Nishibura et al. | 360/132 |
| 4,844,377 | 7/1989 | Shiomi et al. | 360/60 |
| 4,860,128 | 8/1989 | Nakagawa | 360/60 |
| 4,864,439 | 9/1989 | Duurland | 360/132 |
| 4,878,139 | 10/1989 | Hasegawa et al. | 360/99.06 |
| 4,918,550 | 4/1990 | Baranski | 360/94 |
| 5,063,554 | 11/1991 | Uehara | 360/99.06 |
| 5,088,085 | 2/1992 | Uehara | 360/99.06 |
| 5,101,304 | 3/1992 | Sakumoto et al. | 360/96.5 |

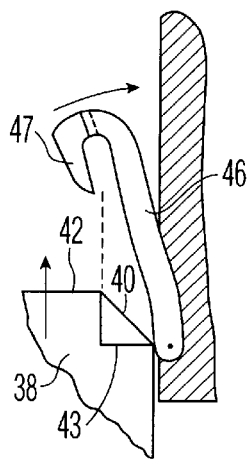 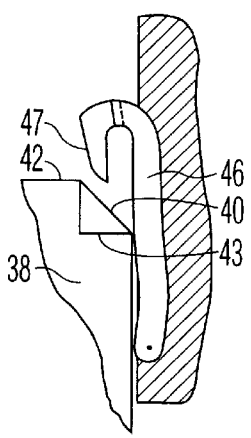 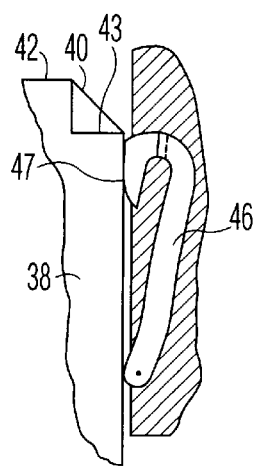 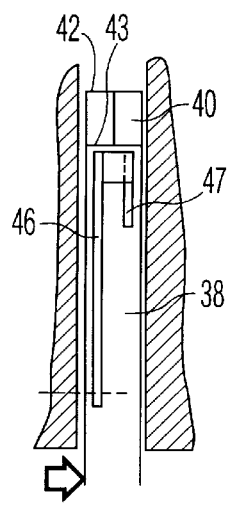
FIG. 18A    FIG. 18B    FIG. 18C    FIG. 18D
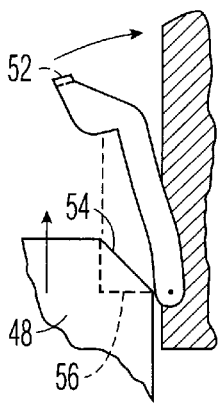 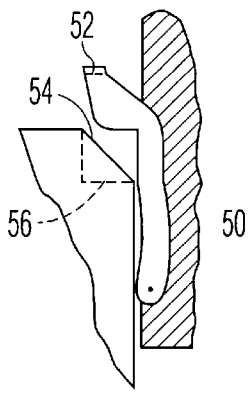 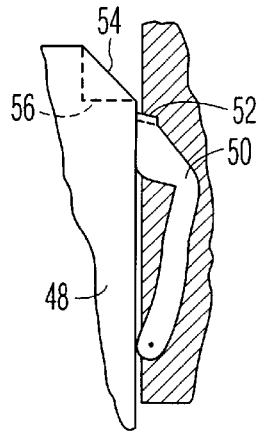 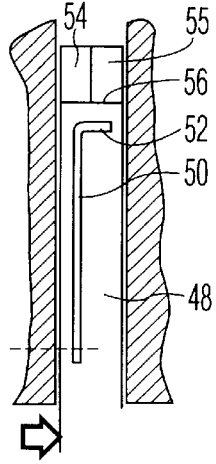
FIG. 19A    FIG. 19B    FIG. 19C    FIG. 19D
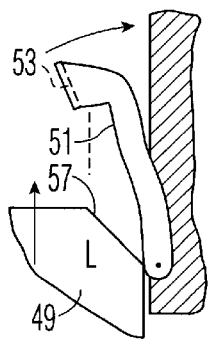 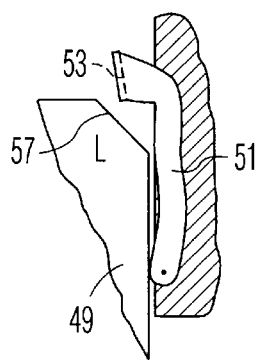 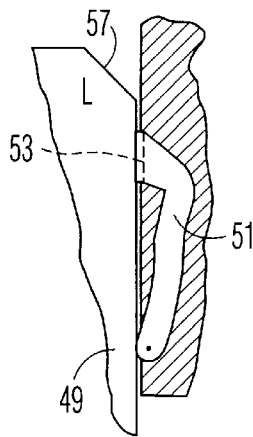 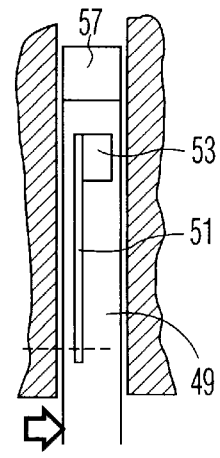
FIG. 20A    FIG. 20B    FIG. 20C    FIG. 20D

DEVICE FOR BLOCKING INSERTION OF UNDERSIZED OBJECTS

This is a continuation of application Ser. No. 08/033,947, filed Mar. 18, 1993, now abandoned, which was a continuation of Ser. No. 07/818,413, filed Jan. 6, 1992, now abandoned, which was a continuation of Ser. No. 07/504, 188, filed Apr. 3, 1998, now abandoned.

BACKGROUND OF THE INVENTION

1. Field of the Invention

The invention relates to a device comprising a wall portion formed with a standard-size loading aperture for the introduction of standard-type objects having a standard width and standard height.

2. Description of the Related Art

Devices of the type referred to above are known. The loading aperture may serve, for example, for the insertion of a cassette or diskette of standard dimensions and shape to enable a record carrier to be read and/or inscribed in the interior of the device. A prior art device is described in, for example, U.S. Pat. No. 5,325,243 by W. J. F. Rath et al., issued Jun. 28, 1994, herewith incorporated by reference. Said application relates to an apparatus constructed to cooperate with a cassette provided with an information disc. Other prior art devices are, for example,magnetic video tape recorders, so-called Compact Cassette magnetic audio tape recorders and personal computers.

The availability of a wide variety of cassettes may lead the consumer astray, which may result in an attempt to introduce cassettes, not having the exactly correct standard dimensions but more or less resembling the appropriate cassettes, into a non compatible apparatus. Obviously, this will succeed only when the incorrect size cassette has such dimensions that it can be inserted into the loading aperture of this noncompatible apparatus. This means that at least one of the dimensions of the incorrect size cassette should be smaller than the corresponding dimension of the correct cassette. Inserting a wrong (incorrect size) cassette into an apparatus or, generally speaking, introducing a wrong object into a device, may have undesirable consequences. For example, it is sometimes difficult to remove the erroneously inserted object from the device. Further, the device may be damaged because the object cannot correctly cooperate with the device. Generally the device will not operate or not operate correctly in conjunction with the wrong object.

Recently personal computers employ magnetic-disc cassettes—or diskettes—provided with a flexible magnetic disc—or floppy disk—having a diameter of 3½". It is envisaged to market optical discs which also have a diameter of 3½", accommodated in a cassette whose dimensions differ from said 3½" diskettes mainly in the thickness direction only. Cassettes accommodating optical discs are also intended for use in conjunction with personal computers. It is not unlikely that a user of a personal computer may think that the loading aperture in the computer housing serve for inserting a floppy-disk diskette into the computer, whereas the device is intended only for use in conjunction with a cassette accommodating an optical disc. Insertion of a floppy disc diskette may give rise to serious damage to the optical pick-up head and to the drive in the personal computer. In any case, the computer will fail to operate correctly.

SUMMARY OF THE INVENTION

It is an object of the invention to provide a device of the type defined in the opening paragraph, which substantially precludes the above mistakes occasioned by confusion of the user and to this end the invention is characterized in that the device comprises blocking means for blocking the introduction of objects having a smaller width and/or height into an internal space. The presence of the blocking means prevents a user from inserting an object of smaller width and/or height into the device, thereby precluding damage and/or an incorrect operation.

An embodiment of the invention is characterized in that there are provided detection means for detecting the presence of an object, which detection means upon detection of an object of the standard type cooperate with the blocking means to discontinue blocking. In principle, the detection means may be of any conceivable type, for example optical, magnetic, pneumatic etc. and may be constructed to cooperate with the blocking means in any conceivable way. Starting from an imaginary space which is bounded by the dimensions of a standard object an embodiment of the invention is of interest which is characterized in that the detection means operate within one or more tolerance fields situated inside the envelope of an imaginary space which is bounded by the dimensions of a standard object and situated near the boundary of the envelope. In this embodiment the detection means have the function to detect whether a physical object is disposed within said tolerance fields.

If a device has a polygonal loading aperture, for example rectangular, it may be advantageous to employ an embodiment of the invention, which is characterized in that the detection means are arranged near at least one of the corners of said space. Another interesting embodiment, whose principal advantage is that the number of sensors needed can be reduced, is characterized in that urging means are provided to urge an object towards one side of the loading aperture and in that the detection means are arranged at an opposite side. The use of the urging means ensures that said tolerance field is always situated at a well defined location, so that at least at one side of the loading aperture no sensor is needed.

Surprisingly simple embodiments of the invention can be obtained, if they are characterized in that: the detection means comprise mechanical detection means which by the introduction of an object of the standard type are movable from a zero position to an end position, in that the blocking means comprise mechanical blocking means such as a moveable obstruction which are movable between a blocking position which prevents insertion into an internal space and a free position, and in that there are provided mechanical transmission means to transmit the movements of the detection means to the blocking means, so that a movement of the detection means from the zero position to the end position results in a movement of the blocking means from the blocking position to the free position and vice versa. In this embodiment the detection means comprise mechanical parts which are moved under the influence of the force with which the object is introduced and which are mechanically coupled to mechanical blocking means. For example, this embodiment may be characterized further in that the detection means and the blocking means are united to form combined means and comprise a pivotable member having a blocking element, and urging means which urge said pivotable member to the zero position/blocking position. In this embodiment the detection means and blocking means are integrated to form a single part. This enables the required number of parts to be reduced.

An embodiment of the invention may be used, which is characterized in that the pivotable member has a detection profile which upon introduction of an object of the standard type contacts the object in a contact point, in such a way that during introduction the contact point moves along the detection profile, thereby pivoting the pivotable member and causing the blocking member to be moved to the free position. In accordance with a further characteristic feature the pivotable member and the blocking member may together form part of a single combined member of a sheet material and the blocking member extends transversely of the remainder of said combined member.

The aforementioned U.S. Pat. No. 5,325,243 describes a system comprising standard cassettes of standard dimensions and associated apparatus, which system comprises at least two types of substantially identical cassettes which exhibit distinctive features of a first type and a second type respectively. The system comprises two types of apparatus, including an apparatus of the first type which accepts cassettes of the first type but does not accept those of the second type and a second type of apparatus accepting cassettes of the second type but not accepting those of the first type, provided that the cassettes are inserted in a correct orientation. In all other cases the cassettes are blocked by blocking means provided for this purpose. A system of this kind may comprise substantially identical cassettes the cassettes of the first type comprising a non-inscribable optical disc and those of the second type comprising an inscribable optical disc. Each of the two types of disc is compatible with only one of the two types of apparatus, so that said apparatuses are provided with means to ensure a selective acceptance of standard cassettes in conformity with the distinctive features they exhibit. In any case, care must be taken that cassettes which do not belong to the system can not be inserted into apparatuses of the system. Surprisingly, the blocking means which are used can be utilised easily in conjunction with the invention by the use of an embodiment which is characterized in that the device belongs to a system comprising standard cassettes of standard dimensions in accordance with the prior U.S. Pat. No. 5,325,243 comprising at least two types of substantially identical cassettes which exhibit different distinctive surfaced-shaped features of a first type and a second type respectively, and comprising at least two types of devices, including devices of a first type, which accept cassette of the first type but do not accept cassettes of the second type, and devices of a second type, which accept cassettes of the second type but do not accept those of the first type, provided that the cassettes are inserted in a correct orientation, and which in other cases block the cassettes, and in that said blocking means for blocking the introduction of objects of a smaller width and/or height also serve for blocking standard cassettes in these cases.

BRIEF DESCRIPTION OF THE DRAWINGS

Embodiments of the invention will now be described in more detail, merely by way of example, with reference to the accompanying diagrammatic drawings, in which.

DETAILED DESCRIPTION OF THE PREFERRED EMBODIMENTS

Figure 1:
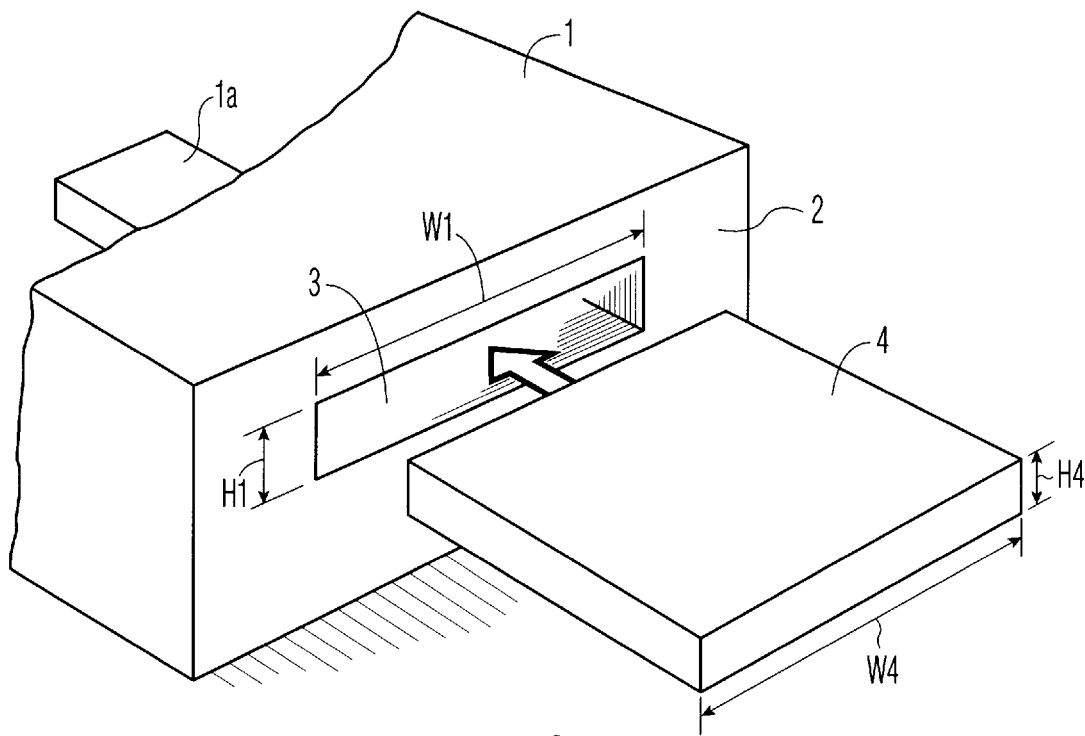
FIG. 1 is a perspective view of a device (shown partly) having a loading aperture, and of an object of standard dimensions to be introduced into the device.

FIG. 1 shows a part of a device 1 comprising a wall portion 2 formed with a loading aperture 3 of standard width W1 and standard height H1. An object 4 having a standard width W4 and a standard height H4 can be introduced into the loading aperture 3. The substantially box-shaped cassettes, which can be introduced into an associated device or player via a substantially rectangular aperture, are well-known. FIG. 1 shows diagrammatically such a player 1, containing a schematically-shown player scanner device 1a and cassette 4. It is desirable to provide protection against erroneous insertion of deviating cassettes of deviating dimensions into the player. Insertion of cassettes having a larger width and/or larger height can be precluded by selecting a width and height not larger than necessary for the loading aperture.

The present invention relates to means against the introduction of objects such as for example substantially block shaped cassettes of such deviating dimensions that the provision just described no longer forms protection. This is the case if the width and/or the height of the deviating cassette is smaller than that of the cassette 4, i.e. when at least one of the dimensions is smaller than the width W4 or the height H4 of the cassette 4. A deviating cassette will then be blocked by the blocking means to be described hereinafter.

The invention may comprise sensors capable of detecting the presence of a cassette in the loading aperture 3 of the player 1. These sensors may be for example optical, electrical, magnetic, mechanical or of another nature. If a cassette to be accepted is detected a blocking means is rendered inoperative. For example, a motor driven loading mechanism is started, enabling the detected cassette to be introduced. In order to ensure that the sensors detect only standard cassettes and reject deviating cassettes these sensors should be arranged at specific locations in the loading aperture.

Figure 2:
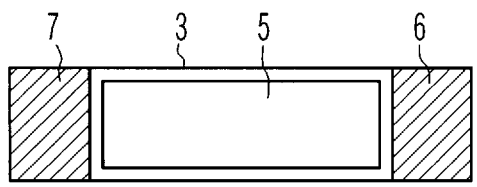
FIG. 2 is a front view, not to scale, showing the loading aperture of the device shown in FIG. 1 and an object situated in the loading aperture and having a deviating width, smaller than the standard width, and adjacent tolerance fields, represented by hatched areas, for the arrangement of sensors to detect the presence of an object.
Figure 3:
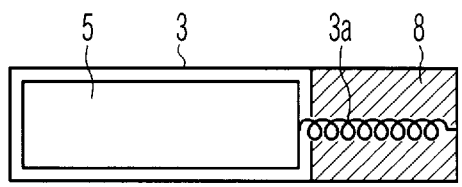
FIG. 3 is a view derived from FIG. 2, the object being urged in the direction indicated by the arrow into a position at the periphery of the loading aperture.

FIG. 2 is a front view showing a loading aperture 3 in which a cassette 5 whose width is too small is situated. A sensor (not shown) is arranged in each of the hatched areas 6 and 7 at opposite sides of the cassettes. The cassette is capable of activating not more than one of the two sensors at a time. However, for acceptance as an associated cassette the simultaneous activation of both sensors is necessary. FIG. 3 shows the same loading aperture 3 with the same cassette 5. However, now the cassette is urged towards one side of the loading aperture, for example under pressure of a spring 3a (shown diagrammatically). In this situation it is adequate to provide one sensor in the hatched area or tolerance field 8, which sensor can be activated only by a cassette of suitable width. An advantage is that the area or tolerance field in which the sensor may be mounted is larger than the areas 6 and 7.

Figure 4:
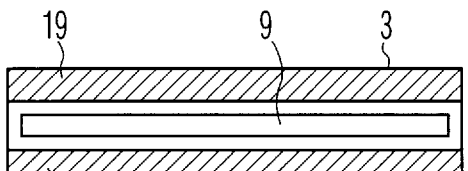
FIG. 4 is a view similar to FIG. 2 but now showing an object of different thickness.
Figure 5:
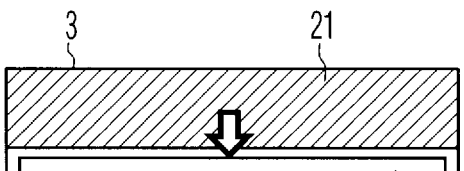
FIG. 5 is a view similar to that shown in FIG. 3 but derived from FIG. 4.

FIGS. 4 and 5 are equivalent to FIGS. 2 and 3 respectively, but now it is verified whether a cassette 9 has a suitable height instead of a suitable width. In FIG. 4, hatched areas 19 and 20 are each available for a sensor (not shown). Because cassette 9 has too small a height, the cassette is capable of activating not more than one of those two sensors at a time. Analogous to FIG. 3, FIG. 5 shows urging of the cassette 9 toward the bottom of the loading aperture, so that it is adequate to provide one sensor in the hatched area 21.

Figure 6:
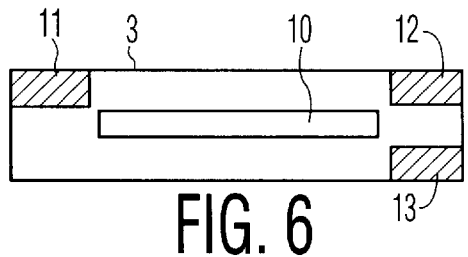
FIG. 6 is a view similar to FIG. 1 and FIG. 4 but now showing an object having both a deviating width and a deviating thickness.

It is possible to check cassettes both for suitable height and for suitable width. FIG. 6 illustrates the situation arising by combining the situations in FIGS. 2 and 4. The cassette 10 is both too narrow and too shallow. By combining a width sensor and a height sensor in one sensor a total of three sensors would be adequate, one in each hatched area 11, 12 and 13. Only a cassette having a suitable width and height is capable of activating all three sensors at the same time. If in some way oblique positioning of the cassette is excluded the use of two sensors will even be adequate, each arranged in one of the two diagonally opposed hatched areas 11 and 13 in FIG. 6. However, when three sensors as described above are used an oblique position need not present any problem.

Figure 7:
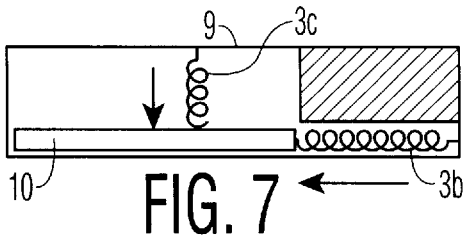
FIG. 7 is a view similar to FIGS. 3 and 4 but now derived from FIG. 6, FIGS. 8A–15B are diagrammatic views showing cooperating parts of an object to be introduced and sensor/blocking means of a device.

FIG. 7 illustrates the situation arising by combining the situations in FIGS. 3 and 5, using springs 3b and 3c (shown diagrammatically). If the width sensor and the height sensor are combined it will be adequate to use only a single sensor in the hatched area or tolerance field 14.

An advantageous embodiment of the invention is obtained if the detection and unblocking functions are integrated. Hereinafter some examples will be shown which use a mechanical sensor integrated with the unblocking means. All the examples involve detection whether the smaller of the two dimensions width and height is adequate, the smaller dimension being referred to hereinafter as "the height". However, in principle there is no basic difference between detection of the smaller and detection of the larger dimension nor is there any difference between width detection and height detection. Hereinafter, a Figure number followed by an A relates to a plan view and a FIG. number followed by a B to a side view. When it is irrelevant whether it is a plan view or a side view the suffix A or B will not be used.

Figure 8A:
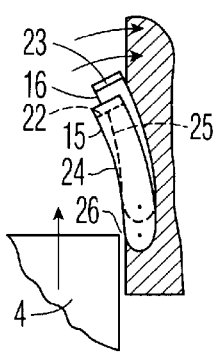
Figure 8B:
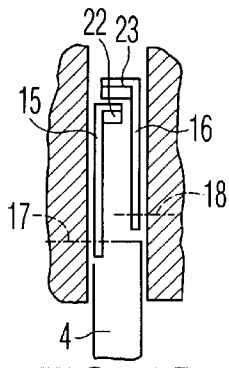
Figure 9A:
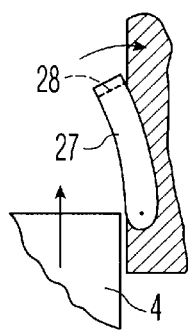
Figure 9B:
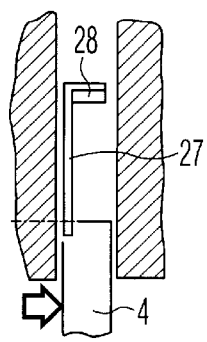

FIGS. 8 and 9 show an embodiment employing catches 15 and 16 which can pivot in a horizontal plane about axes 17 and 18. The catches are held in the position shown by means of spring pressure and a stop (spring and stop not shown for simplicity).

The catches 15 and 16 constitute mechanical detection means which are movable from a zero position to an end position by the introduction of an object of the standard type. The blocking means comprise mechanical blocking means which are movable between a blocking position and a free position. Mechanical transmission means are provided to transmit the movements of the detection means to the blocking means in such a way that a movement of the detection means from the zero position to the end position results in a movement of the blocking means from the blocking position to the free position and vice versa.

The detection means and blocking means are united to form combined means comprising pivotable members in the form of catches 15 and 16 comprising blocking elements 22 and 23. The urging means, not shown, which urge the catches into their zero positions comprise, for example, compression or tension springs, magnets, torsion springs arranged at the location of the pivotal axes 17 and 18 etc.

The pivotable members in the form of the catches 15 and 16 have detection profiles 24, 25 which upon introduction of the object 4 of the standard type contact the object at a contact point (for example 26) so that during introduction the contact point moves along the detection profile and pivots the catch, thereby moving the blocking member to the free position.

The catches 15 and 16 are made of a sheet material and each comprise a blocking element 22 or 23 which extends transversely of the remainder of the catch.

The embodiment shown in FIG. 8 is based on the principle illustrated in FIG. 4. Only a cassette of adequate height is capable of urging the two catches 15 and 16 aside against spring pressure during introduction to allow the free passage of the cassette. A cassette of inadequate height will not be capable of pressing more than one of the two catches aside and will be blocked by the bent end portion of the other (or both) catches.

The embodiment shown in FIG. 9 is based on the same principle as illustrated in FIG. 5. Only a cassette 4 of suitable height is capable of pressing a single catch 27 aside to allow the free passage of the cassette. A cassette of inadequate height will not be capable of pressing the catch 27 aside because the cassette is urged against the opposite side of the loading aperture. The cassette will be blocked by the bent end portion 28 of the catch.

Figure 10A:
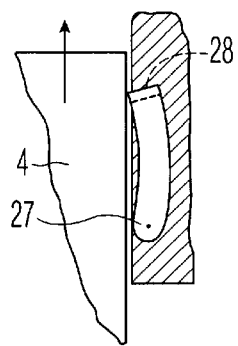
Figure 10B:
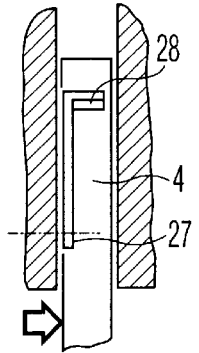

FIG. 10 illustrates a same situation in which a cassette of adequate height has just moved past the catch shown in FIG. 9.

Figure 11A:
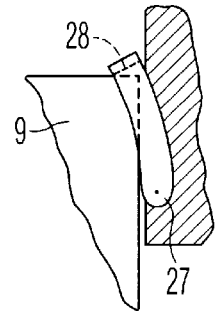
Figure 11B:
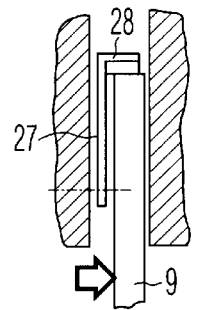
Figure 12A:
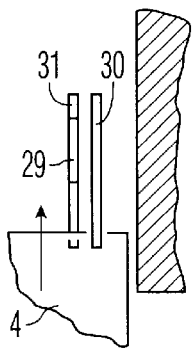
Figure 12B:
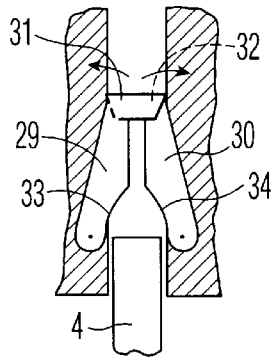
Figure 13A:
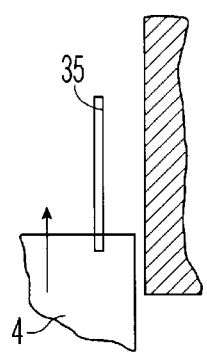
Figure 13B:
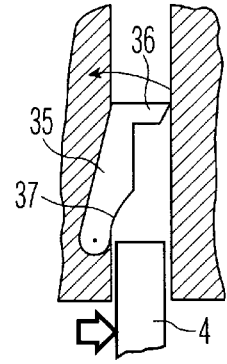
Figure 14A:
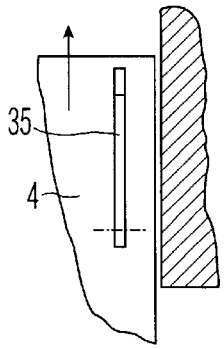
Figure 14B:
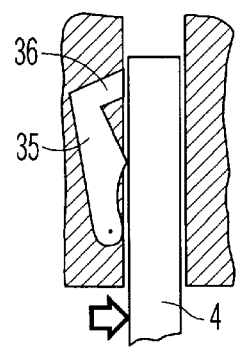
Figure 15A:
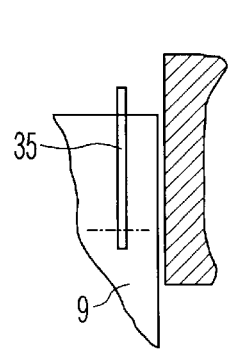
Figure 15B:
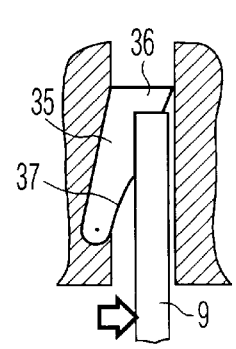

FIG. 11 shows a situation in which a cassette 9 of inadequate height is blocked by the catch 27. The Figure also illustrates the operation of the embodiment shown in FIG. 8.

FIGS. 12 to 15 are equivalent to FIGS. 8 to 11 respectively, except that in the present embodiments use is made of catches 29, 30, 35 which are pivotable in a vertical plane about lateral axes. The catches comprise projections 31, 32 and 36 and detection profiles 33, 34, 37.

The foregoing describes how it is possible to provide protection against the introduction of cassettes of deviating dimensions. Moreover, protection is afforded against the insertion of a cassette which is oriented incorrectly, for example turned through 90 degrees about an arbitrary axis, assuming that the relevant dimensions are not the same. However, rotations of 180 degrees about three mutually perpendicular axes are also possible, the relevant cassette being turned back to front and/or upside down, after which insertion is possible. The aforementioned U.S. Pat. No. 5,325,243 describes how protection against insertion of an incorrectly oriented cassette is possible in a system using standard cassettes of standard dimensions, comprising at least two types of substantially identical cassettes but having mutually different distinctive features.

The blocking means described above, for blocking the introduction of objects of smaller width and/or height, may also serve for blocking standard cassettes, depending on the presence of distinctive features.

FIGS. 18, 19 and 20 by way of example show how the embodiment shown in FIG. 9 (described with reference to FIGS. 10 and 11) can be modified, using a cassette as described in said U.S. Pat. No. 5,325,243. Thus the following functions are realised:

protection against insertion of cassettes of deviating height, protection against insertion of cassettes having the standard height but having deviating distinctive features, protection against the insertion of cassette of standard height and having associated distinctive features but oriented incorrectly relative to the loading aperture.

Figure 16:
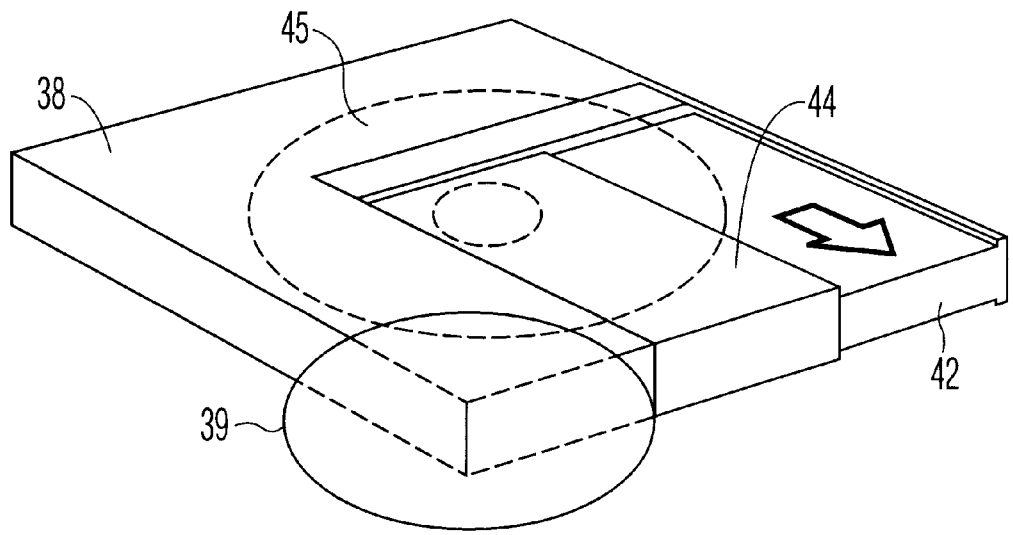
FIG. 16 is a perspective view of a disc cassette of standard dimensions.
Figure 17A:
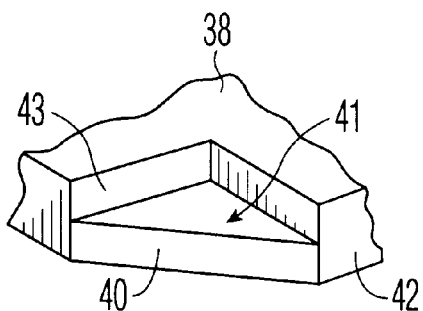
FIG. 17A–B are underneath views and plan views of distinctive features such as may be provided at the corner of a disc cassette indicated by the oval in FIG. 16, and FIGS. 18A–20D are views similar to FIGS. 8A–15B but now showing different embodiments, the object being constituted by a cassette similar to that shown in FIG. 16.
Figure 17B:
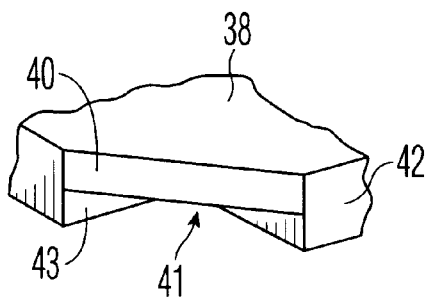

It is to be noted that all these functions can be performed using only a single catch in every player. The operation of the embodiment shown in FIGS. 18, 19 and 20 will now be described below. FIG. 16 shows a cassette 38 as described in said prior U.S. Pat. No. 5,325,243. FIG. 17 shows the distinctive features with which the cassette 38 in FIG. 16 may be provided in the area 39. The distinctive features comprise a bevelled portion 40 occupying half the height of the cassette. In the other half a recess 41 is situated, which is bounded by an abutment wall or a stop 43 extending parallel to the front 42 of the cassette. The cassette shown is of the type having a shutter 44 to provide access to an information disc 45.

FIG. 18 shows the cassette 38 and the manner in which it cooperates with the catch 46 in the loading aperture of an apparatus. FIG. 18 shows the initial situation in plan view. The catch 46 is held in this position by means of spring pressure and a stop (not shown). The position into which the catch is urged when the inserted cassette has a suitable height is shown in FIG. 18B, a comparable situation being shown in FIG. 10. If the height of the cassette is inadequate the catch remains in the position shown in FIG. 18A and the cassette is blocked, which is comparable to the situation illustrated in FIG. 11. In the initial position illustrated in FIG. 18A the portion of the catch which causes blocking is situated in the tolerance field so far from the corner point of the cassette of inadequate height and having a bevelled portion of the same height as that of the cassette 38 is not capable of urging the catches aside by cooperation between the bevelled portion and the projection 47. FIG. 18c shows the position into which the catch is urged when the cassette has a suitable height, has the correct distinctive feature, and is also oriented correctly. In that case the catch engages with the bevelled portion 40, enabling the catch to be pressed aside against the spring pressure, after which the cassette can move past the catch. If the cassette does not have the correct distinctive feature or is oriented incorrectly, the catch will remain in the position illustrated in FIG. 18B and thereby block the passage of the cassette. In that case the catch cannot engage with a bevelled portion, so that the catch will not be pressed aside. FIG. 18D finally shows a side view of the situation illustrated in FIG. 18C.

FIGS. 19 and 20 show two situations similar to those illustrated in FIG. 18, but now for cassettes 48 and 49 having deviating distinctive features and suitably modified catches 50 and 51 having projections 52 and 53 respectively.

Again the distinctive features of the cassette 48 comprise a bevelled portion 54 occupying half the height, a recess 55 and a stop 56. These elements are now situated at locations which have been interchanged in comparison with the distinctive features of the cassette 38 in FIG. 16.

The cassette 49 in FIG. 20 comprises a bevelled portion 57 occupying the entire height. In the orientation shown this cassette will not be blocked by any of the catches 46, 50 or 51. The catch 51 comprising the projection 53 has such a shape that in the orientation shown neither of the cassettes 38, 48 or 49 will be blocked.

In the foregoing specific details, such as the geometrical shape of the catches are not described comprehensively for the sake of brevity because they can be derived fully and unambiguously from the various views shown in the drawings by those skilled in the art.

Within the scope of the invention a variety of embodiments other than those described are possible. This applies in particular to the kind, dimensions and shape of the standard objects to be accepted, the sensors being used, and the blocking means being used. In this respect "blocking" is to be understood to include the non-energisation of the loading means in the case of motor-driven loading means, which thereby effectively inhibits insertion.

I claim:

1. A device having an internal space, and a wall portion having a loading aperture formed therein communicating with said space, for a) accepting insertion of an object having a correct size inserted through said aperture, said object having respective larger and smaller given cross-section dimensions in respective major and minor directions, orthogonal each other and a direction of insertion, one of said dimensions being a given width and the other of said dimensions being a given height, said loading aperture having an opening width and height respectively exceeding said given width and height by a respective clearance, and b) preventing complete insertion of an object having an incorrect size, said incorrect size being an incorrect cross-section dimension less than the corresponding given cross-section dimension in at least one of said major and minor directions, into said internal space, wherein said device comprises:

means for blocking complete insertion into said internal space of a partially-inserted object being inserted through said aperture toward said space, means, for urging said partially-inserted object in respective directions parallel to said major and minor directions, consisting of means for urging in respective first and second directions toward one corner of said aperture; said device being free from means for urging said Partially-inserted object in directions opposite said first and second directions, means for detecting the respective cross-section dimension of said partially-inserted object in each of said major and minor directions, and means for disabling said means for blocking, to permit complete insertion of said partially-inserted object into said internal space responsive to detecting at least that the cross-section dimension of the partially-inserted object in each of said major and minor directions equals the corresponding given cross-section dimension.

2. A device as claimed in claim 1, wherein responsive to said partially-inserted object having said correct size, said means for detecting also detects the existence or non-existence, in said partially-inserted object, of a given surface-shaped feature at an inserted corner of said partially-inserted object, and said means for disabling is responsive only to detection of the respective cross-section dimension in each of said major and minor directions and existence of said surface-shaped feature.

3. A device as claimed in claim 1, wherein said means for detecting comprises means, arranged adjacent the corner diagonally opposite said one corner of said aperture, for detecting the cross-section dimensions.

4. A device as claimed in claim 3, wherein responsive to said partially-inserted object having said correct size, said means for detecting also detects the existence or non-existence, in said partially-inserted object, of a given surface-shaped feature at an inserted corner of said partially-inserted object, and said means for disabling is responsive only to detection of the respective cross-section dimension in each of said major and minor directions and existence of said surface-shaped feature.

5. An apparatus for scanning a record carrier contained within a cassette having a correct size, said correct size being a generally rectangular cross section in height and width directions with a given height and a given width, said apparatus having an internal space for receiving said record carrier, a wall portion having a generally rectangular loading aperture formed therein communicating with said space, said aperture having a corner and an opening height and width respectively exceeding said given height and width by respective clearances, and a scanning device within said space for scanning a record carrier contained within said cassette having said correct size when fully inserted through said aperture, wherein the apparatus further comprises means for a) accepting insertion of said cassette having said correct size when inserted through said aperture, and b) preventing complete insertion of an incorrect size cassette, having an incorrect cross-section dimension less than at least one of said given height and given width respectively, into said internal space, and wherein the means for accepting and preventing comprises:

means for blocking complete insertion into said internal space of a partially-inserted cassette being inserted through said aperture toward said space, means for urging the partially-inserted cassette in both the width and height directions toward said corner of the aperture: said apparatus being free from means for urging said partially-inserted cassette in directions away from said corner, means for detecting arranged adjacent the corner diagonally opposite said corner of said aperture, for detecting the cross-section dimension of said partially-inserted cassette in each of said directions, and means for disabling said means for blocking, to permit complete insertion of said partially-inserted cassette into said internal space responsive to detecting that the height and width of said partially-inserted cassette equal said given height and given width respectively, whereby interaction between said incorrect size cassette and said scanning device within said internal space is prevented.

6. An apparatus as claimed in claim 5, wherein said means for detecting, responsive to said partially-inserted cassette having said correct size, also detects the existence or non-existence, in said partially-inserted cassette, of a given surface-shaped feature at an inserted corner of the partially-inserted cassette, and said means for disabling permits said complete insertion of said cassette having said correct size only in response to also detecting existence of said surface-shaped feature.

7. A device comprising a wall portion formed with a polygonal loading aperture for the introduction of an object having a correct size including a correct width and correct height, wherein the device comprises:

blocking means for blocking the introduction of objects having a width less than said correct width, detection means for detecting the presence of a partially introduced object being introduced through said loading aperture, upon detection of said object having a correct size said detection means cooperating with said blocking means to discontinue blocking; and wherein said detection means operates within a tolerance field situated inside the envelope of a space having a width and height equal to said correct width and height, said tolerance field being situated adjacent a boundary of said envelope, and means for urging said partially introduced object towards one side of the loading aperture, characterized in that said blocking means blocks the introduction of objects having a height less than said correct height, said means for urging urges said partially introduced object simultaneously towards one side of the loading aperture and towards an adjoining further side so that said partially introduced object is urged towards a corner between the adjoining sides, said tolerance field is situated diametrically opposite to said corner, and said detection means operates exclusively in said tolerance field.

8. A device as claimed in claim 7, characterized in that:

said object having said correct size is part of a system of quadrilateral cassettes having standardized outside dimensions and comprising at least first and second types of cassettes which are substantially identical, but which have mutually different distinctive features of a first type and a second type respectively at a cassette front corner; and said distinctive features comprise shape features of the cassette at said front corner, said device is compatible with and designed to accept cassettes of the first type when inserted in a correct orientation, and is incompatible with cassettes of the second type, said blocking means cooperates with the distinctive features of a partially introduced cassette of the first type when inserted in the correct orientation to discontinue blocking, and said blocking means blocks introduction of a cassette of the second type.

9. A device as claimed in claim 7, characterized in that:

said detection means comprises mechanical detection means which are movable, in response to introduction of said object having said correct size, from a zero position to an end position, said blocking means comprises mechanical blocking means which are movable between a blocking position and a free position, and the device further comprises mechanical transmission means for transmitting movements of the mechanical detection means to the mechanical blocking means, such that movement of the mechanical detection means from the zero position to the end position results in movement of the mechanical blocking means from the blocking position to the free position.

10. A device as claimed in claim 9, characterized in that said detection means and said blocking means are combined, and comprise a pivotable member having a blocking element and urging means for urging the pivotable member to a combined zero and blocking position.

11. A device as claimed in claim 10, characterized in that:

said object having said correct size is part of a system of quadrilateral cassettes having standardized outside dimensions and comprising at least first and second types of cassettes which are substantially identical, but which have mutually different distinctive features of a first type and a second type respectively at a cassette front corner; and said distinctive features comprise shape features of the cassette at said front corner, and the pivotable member has a detection profile which, upon partial introduction of a cassette of the first type, contacts the partially introduced cassette at a contact point such that during introduction the contact point moves along the detection profile, thereby pivoting the pivotable member and moving the blocking member to the free position.

12. A device as claimed in claim 11, characterized in that the combined detection means and blocking means comprise a lever which is pivotable about a pivoting axis oriented perpendicularly relative to a direction of insertion of the partially introduced cassette, and the blocking element is constituted by a hook at a free end of the lever.

13. A device as claimed in claim 12, characterized in that and the blocking element extends transversely of the remainder of the combined detection means and blocking means.

* * * * *